United States Patent
Englehorn et al.

(10) Patent No.: US 11,149,100 B2
(45) Date of Patent: Oct. 19, 2021

(54) PROPYLENE-BASED IMPACT COPOLYMERS AND PROCESS AND APPARATUS FOR PRODUCTION

(71) Applicant: ExxonMobil Chemical Patents Inc., Baytown, TX (US)

(72) Inventors: Blu E. Englehorn, Houston, TX (US); Chon-Yie Lin, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/648,294

(22) PCT Filed: Aug. 21, 2018

(86) PCT No.: PCT/US2018/047244
§ 371 (c)(1),
(2) Date: Mar. 18, 2020

(87) PCT Pub. No.: WO2019/089111
PCT Pub. Date: May 9, 2019

(65) Prior Publication Data
US 2020/0283549 A1 Sep. 10, 2020

Related U.S. Application Data

(60) Provisional application No. 62/581,819, filed on Nov. 6, 2017.

(30) Foreign Application Priority Data

Dec. 21, 2017 (EP) ..................................... 17209429

(51) Int. Cl.
*C08F 10/06* (2006.01)

(52) U.S. Cl.
CPC .......... *C08F 10/06* (2013.01); *C08F 2800/20* (2013.01)

(58) Field of Classification Search
CPC .... B01J 19/22; B01J 19/1818; B01J 19/2435; B01J 8/025; B01J 19/1837;
(Continued)

(56) References Cited

U.S. PATENT DOCUMENTS 4,354,959 A 10/1982 Epstein et al.
6,130,180 A 10/2000 Stewart et al.
(Continued)

FOREIGN PATENT DOCUMENTS

CN 102165006 B 11/2013
EP 1 908 767 A1 4/2008
(Continued)

*Primary Examiner* — William K Cheung (57) ABSTRACT

A process of polymerizing olefins comprising combining propylene with a polymerization catalyst, hydrogen, and at least one external electron donor, such as at least one amino-silane donor, to form polypropylene in a first polymerization medium under solution or slurry conditions at or below the bubble point; removing hydrogen from the first polymerization medium and providing a first olefin/polyolefin separation step to form a second polymerization medium; transferring the second polymerization medium to a gas phase reactor and further combining with ethylene; obtaining a propylene-based impact copolymer. The propylene-based impact copolymer desirably has a melt flow rate of at least 60 g/10 min and is useful in automotive components.

24 Claims, 3 Drawing Sheets (58) Field of Classification Search
CPC . B01J 2219/0004; C08F 10/06; C08F 210/06;
C08F 2/001; C08F 4/651; C08F 4/6465;
C08F 2800/20; C08F 2500/12; C08F
2500/04; C08F 2500/17; C08F 110/06;
C08F 2500/15
USPC .......................................................... 526/66
See application file for complete search history.

(56) References Cited

U.S. PATENT DOCUMENTS

| | | |
|---|---|---|
| 6,221,974 B1 | 4/2001 | Harkonen et al. |
| 6,716,936 B1 | 4/2004 | McGrath et al. |
| 7,396,950 B2 | 7/2008 | Yoshikiyo et al. |
| 7,531,607 B2 | 5/2009 | Vestberg |
| 8,026,311 B2 * | 9/2011 | Migone ................ C08F 210/06 525/191 |
| 8,822,602 B2 | 9/2014 | Leskinen et al. |
| 9,243,081 B2 | 1/2016 | Sugano et al. |
| 9,255,166 B2 | 2/2016 | Grein et al. |
| 9,309,334 B2 | 4/2016 | Meka et al. |
| 9,416,262 B2 | 8/2016 | Kock et al. |
| 9,587,050 B2 | 3/2017 | Hosaka et al. |
| 9,809,660 B2 | 11/2017 | Hottovy et al. |
| 2004/0054101 A1 | 3/2004 | Saudemont et al. |
| 2005/0032991 A1 | 2/2005 | Chosa et al. |
| 2011/0034651 A1 | 2/2011 | O'Reilly |
| 2012/0004378 A1 | 1/2012 | Hosaka |
| 2012/0062738 A1 | 3/2012 | Ohkawn et al. |
| 2012/0178883 A1 | 7/2012 | Massari et al. |
| 2013/0296506 A1 | 11/2013 | Lawson et al. |
| 2016/0009836 A1 | 1/2016 | Sugano et al. |
| 2016/0198344 A1 | 7/2016 | Oba et al. |
| 2016/0208032 A1 | 7/2016 | Vestberg et al. |
| 2017/0129711 A1 | 5/2017 | Lane |

FOREIGN PATENT DOCUMENTS

| | | |
|---|---|---|
| EP | 2 360 190 A1 | 8/2011 |
| JP | 2005220281 | 8/2005 |
| WO | WO 2017/034722 A1 * | 3/2017 |

* cited by examiner

PROPYLENE-BASED IMPACT COPOLYMERS AND PROCESS AND APPARATUS FOR PRODUCTION

CROSS-REFERENCE OF RELATED APPLICATIONS

This application is a 371 National Phase entry of International Application No. PCT/US2018/047244, filed Aug. 21, 2018 and claims priority to and the benefit of U.S. Provisional Application No. 62/581,819, filed Nov. 6, 2017, and EP 17209429.4 which was filed Dec. 21, 2017, the disclosures of which are incorporated herein by reference.

FIELD OF THE INVENTION

The present invention(s) relate to processes to produce in-reactor blends of polypropylene and ethylene-propylene copolymer, or propylene-based impact copolymers (ICP), and the polyolefin itself, and in particular the use of unique external electron donors in a staged solution or slurry polymerization process to make a high melt flow rate impact copolymer.

BACKGROUND

Propylene-based impact copolymers, also called "heterophasic propylene copolymers" or "propylene-based block copolymers," are known in the industry as highly useful polymers for forming articles suitable for many applications including automobile components and appliances. They can be made by physical blending processes, but many commercial ICP's are made by in-reactor ("in situ") blending. Such process are advantageous in the amount of polymer that can be produced, but the process to produce ICP's by in-reactor blending can present challenges.

Most ICP's on the market have a melt flow rate (MFR, 230° C./2.16 kg ASTM D1238) within a range from 2 to 20 or 30 g/10 min. Producing ICP's of relatively high MFR containing a high intrinsic viscosity (IV) ethylene-propylene copolymer (EP or EP copolymer or rubber "EPR") phase with existing polypropylene loop slurry reaction systems is a challenge. Increasing the melt flow of the final ICP product, while maintaining equivalent- or higher-IV rubber, requires increasing the polypropylene MFR. The polypropylene MFR is controlled in typical polypropylene reactions via hydrogen, which acts as a chain-termination agent. However, due to the necessity of maintaining a two-phase slurry medium (solids and liquid with no or very little gas) such that flow in the reactors is maintained, the amount of hydrogen must often be limited to less than the polymerization media's "bubble point." If the loop slurry reactors reach this point and develop a gas pocket, circulation will stop and the reactors must be shut down and emptied or they will plug. Since the hydrogen concentration reaches a practical limit, so then does the MFR of the polypropylene.

The limits of hydrogen solubility in solution and slurry processes presents particular challenges in making ICP's. Staying below the bubble point can be achieved in a number of ways, such as operating at a pressure and/or temperature below the bubble point, but each has practical disadvantages or limitations. Lowering temperature is impractical due to the cost of chilling requirements of the reactor and capacity limitations involved, while raising pressure can take the system to supercritical fluid operation and/or require extremely expensive equipment upgrades to operate safely at higher pressure. What is needed is an economical method of producing higher MFR ICP's without making expensive alterations to existing reactors or building new capital intensive reactors.

References of interest include: U.S. Pat. Nos. 4,354,959; 6,130,180; 6,221,974; 7,396,950; 8,822,602; 9,243,081; 9,255,166; 9,309,334; 9,416,262; 9,587,050; 9,809,660; US 2004/054101; US 2005/032991; US 2011/034651; US 2012/004378; US 2012/062738; US 2012/0178883; US 2016/009836; US 2016/198344; US 2017/129711; EP 1 908 767 A1; EP 2 360 190 A1; CN 102165006 B; and JP 2005220281.

SUMMARY

Disclosed herein is a process to produce polyolefins comprising (or consisting essentially of) combining olefins with a polymerization catalyst and hydrogen in the presence of at least one amino-silane donor to form a polymerization medium, the process comprising at least a first stage and at least a second stage, wherein the polymerization medium is transferred from at least the first stage to at least the second stage; wherein hydrogen is removed from the polymerization medium prior to transferring the polymerization medium from the first stage to the second stage; and wherein at least one first stage is a solution or slurry polymerization process and at least one second stage is a gas phase polymerization process, and wherein there is only one olefin/polyolefin separation step between the first and second stages.

Also disclosed is a process of polymerizing olefins comprising (consisting essentially of) combining propylene with a polymerization catalyst, hydrogen, and at least one amino-silane donor to form polypropylene in a polymerization medium under solution or slurry conditions at or below the bubble point; removing hydrogen from the polymerization medium; transferring the polymerization medium to a gas phase reactor and further combining with ethylene; and obtaining a propylene-based impact copolymer comprising an ethylene-propylene copolymer in a continuous phase of polypropylene, the ICP having a melt flow rate of at least 60 g/10 min.

Also disclosed is a process of polymerizing olefins comprising (or consisting essentially of) combining propylene with a polymerization catalyst, hydrogen, and at least one external electron donor to form polypropylene in a first polymerization medium under solution or slurry conditions at or below the bubble point; removing hydrogen from the first polymerization medium; providing a first olefin/polyolefin separation step to form a second polymerization medium; transferring the second polymerization medium to at least one gas phase reactor and further combining with ethylene; obtaining a propylene-based impact copolymer comprising an ethylene-propylene copolymer in a continuous phase of polypropylene; and providing a second olefin/polyolefin separation step.

Also disclosed is a propylene-based impact copolymer comprising (or consisting of, or consisting essentially of) within the range from 5, or 8 wt % to 20, or 25, or 30 wt % of an ethylene-propylene copolymer, by weight of the propylene-based impact copolymer, imbedded in a continuous phase of polypropylene; wherein the ethylene-propylene copolymer comprises within the range from 25, or 30, or 35 wt % to 40, or 45, or 50, or 55 wt % ethylene-derived units by weight of the ethylene-propylene copolymer, and the propylene-based impact copolymer has an MFR within a range from 60, or 80, or 100 g/10 min to 130, or 140, or 160, or 180, or 200 g/10 min, and an $Mw_{(EP)}/Mw_{(PP)}$ of greater than 5, or 6, or 10, or within a range from 5, or 6, or 10 to 14, or 16, or 20.

Also disclosed is a polymerization apparatus comprising (or consisting essentially of) at least one liquid or slurry polymerization reactor; at least one second reactor fluidly connected and in series with the at least one liquid or slurry polymerization reactor; a first olefin/polyolefin separation means located within the fluid connection; and a second olefin/polyolefin separation means fluidly connected downstream of the at least one second reactor.

DETAILED DESCRIPTION

In the inventive process(es), the problem of hydrogen concentration limit is solved by improving the hydrogen's efficiency, or hydrogen response, by way of the catalyst system employed. Specifically, the use of an external aminosilane donor used with Ziegler-Natta polymerization catalysts provides this higher response. This allows for the production of higher MFR, high IV ICP products without costly reaction equipment upgrades.

A secondary benefit of the present invention(s) is the ability to produce higher MFR (greater than 60 g/10 min) ICP's with no corresponding increase in polyolefin fines, dust generation, or reactor upset. Some process problems can be directly correlated to the amount of hydrogen used, or changes in the hydrogen used, to produce the homopolymer in the first reaction steps of the process. By improving the hydrogen response, lesser, similar or only slightly increased quantities of hydrogen can produce the desired higher MFR polymers as opposed to simply increasing the quantity of hydrogen used as in prior generation catalyst systems. This allows consistent operation below the bubble point of the system and avoids reactor upsets.

As used herein, the "bubble point" is the pressure, temperature, and gas concentration at which gas accumulates into gaseous bubbles in a solution or slurry medium.

As used herein, the term "polypropylene" refers to homopolymers of propylene monomers (propylene-derived units) or copolymers of propylene and less than 4, or 3, or 2, or 1 or 0.5 wt %, by weight of the polypropylene, of ethylene or C4 to C10 α-olefins. The polypropylene is most preferably a homopolymer of propylene, but in any case of a homopolymer or copolymer, it may be referred to as "hPP".

As used herein, an "olefin/polyolefin separation" step, apparatus, means or stage refers to any process or means of separating unreacted olefin monomer from polyolefin that has formed, for example, from a polymerization medium, such as by physical separation and/or separation by heating and/or pressure changes to the mixture, and as used herein preferably refers to the separation of propylene from forming polypropylene, ethylene-propylene copolymer and/or the impact copolymer.

As used herein, a "polymerization medium" is a mixture (liquids, gases and/or solids) comprising at least olefins such as propylene with catalyst components such as solid Ziegler-Natta polymerization catalyst, and preferably including activators for the polymerization catalyst, hydrogen as a chain terminating agent, and one or more external electron donors, and also preferably formed polyolefin such as polypropylene and/or ethylene-propylene copolymer.

Process Overview

The ICP's made by the process herein, preferably ethylene-propylene copolymer in a continuous phase of polypropylene, can be produced by any means of olefin polymerization. Most preferably, a single catalyst is used such as a Ziegler-Natta polymerization catalyst (hereinafter may be referred to as "polymerization catalyst" or simply "catalyst") with one or more activators and/or external electron donors in a slurry polymerization system, preferably two external donors whose overall concentration can be varied, and/or varied with respect to one another. The process may occur in a solution polymerization process wherein all components of the system stay mostly (greater than 98%) or completely solubilized, or in a slurry polymerization system wherein one or more components of the system are not in solution.

The phrases "slurry polymerization process" or "slurry polymerization reactor" refer to a process or reactor that handles polypropylene that is only partly dissolved or not dissolved at all in the polymerization medium, either olefin, solvent, or both, typically having at least 20 wt % polypropylene suspended or not dissolved. In a typical solution or slurry polymerization process, catalyst components, solvent, olefins and hydrogen (when used) are passed under pressure to one or more polymerization reactors. Catalyst components may be passed to the polymerization reactor as a mixture in aliphatic hydrocarbon solvent, in oil, a mixture thereof, or as a dry powder. Most preferably, the polymerization process is otherwise carried out using propylene as the medium to carry the components and exchange heat with the environment. A second reactor(s), preferably a single gas phase reactor (GPR), is used to produce the ethylene-propylene copolymer portion of the ICP.

Catalyst

In any embodiment the single catalyst is a Ziegler-Natta catalyst that preferably includes a solid titanium catalyst component comprising titanium as well as magnesium, halogen, at least one non-aromatic "internal" electron donor, and at least one, preferably two or more "external" electron donors. The solid titanium catalyst component, also referred to as a Ziegler-Natta catalyst, can be prepared by contacting a magnesium compound, a titanium compound, and at least the internal electron donor. Examples of the titanium compound used in the preparation of the solid titanium catalyst component include tetravalent titanium compounds having the formula $Ti(OR_n)X_{4-n}$, wherein "R" is a hydrocarbyl radical, "X" is a halogen atom, and "n" is from 0 to 4. For purposes of this disclosure, a hydrocarbyl radical is defined to be C1 to C20 radicals, or C1 to C10 radicals, or C6 to C20 radicals, or C7 to C21 radicals, any of which may be linear, branched, or cyclic where appropriate (aromatic or non-aromatic).

Preferably, the halogen-containing titanium compound is a titanium tetrahalide, or titanium tetrachloride. Preferably, the magnesium compound to be used in the preparation of the solid titanium catalyst component includes a magnesium compound having reducibility (or capable of alkyl substitution) and/or a magnesium compound having no reducibility. Suitable magnesium compounds having reducibility may, for example, be magnesium compounds having a magnesium-carbon bond or a magnesium-hydrogen bond. Examples of useful magnesium compounds include dimethyl magnesium, diethyl-magnesium, dipropyl magnesium, dibutyl magnesium, diamyl magnesium, dihexyl magnesium, didecyl magnesium, magnesium ethyl chloride, magnesium propyl chloride, magnesium butyl chloride, magnesium hexyl chloride, magnesium amyl chloride, butyl ethoxy magnesium, ethyl butyl magnesium, and/or butyl magnesium halides. In combination with the magnesium compound, the titanium-based Ziegler-Natta catalyst is said to be supported, thus the solid part of the catalyst.

In any embodiment the Ziegler-Natta catalysts are used in combination with an activator, also referred to herein as a Ziegler-Natta activator. Compounds containing at least one aluminum-carbon bond in the molecule may be utilized as the activators, also referred to herein as an organoaluminum activator. Suitable organoaluminum compounds include organoaluminum compounds of the general formula $R^1{}_mAl(OR^2)_nH_pX_q$, wherein $R^1$ and $R^2$ are identical or different, and each represents a C1 to C15 hydrocarbyl radical (alkyl or aryl), preferably a C1 to C4 alkyl; "X" represents a halogen atom; and "m" is 1, 2, or 3; "n" is 0, 1, or 2; "p" is 0, 1, 2, or 3; and "q" is 0, 1, or 2; and wherein m+n+p+q=3. Other suitable organoaluminum compounds include complex alkylated compounds of aluminum represented by the general formula $M^1AlR^1{}_4$, wherein $M^1$ is lithium, sodium, or potassium, and $R^1$ is as defined above. Suitable examples of the organoaluminum compounds include trialkyl aluminums such as trimethyl aluminum, triethyl aluminum and tributyl aluminum; trialkenyl aluminums such as triisoprenyl aluminum; dialkyl aluminum alkoxides such as diethyl-aluminum ethoxide and dibutyl aluminum ethoxide; alkyl aluminum sesquialkoxides such as ethyl aluminum sesquiethoxide and butyl aluminum sesquibutoxide.

Electron donors are present with the metal components described above in forming the catalyst suitable for producing the polypropylenes described herein. Both "internal" and "external" electron donors are desirable for forming the catalyst suitable for making the polypropylene described herein. More particularly, the internal electron donor may be used in the formation reaction of the catalyst as the transition metal halide is reacted with the metal hydride or metal alkyl. Examples of suitable internal electron donors include amines, amides, ethers, esters, ketones, nitriles, phosphines, stilbenes, arsines, phosphoramides, thioethers, thioesters, aldehydes, alcoholates, and salts of organic acids, any of which may include an aromatic group. The internal electron donors are typically part of the solid catalyst component, while the external electron donors are typically added separately from the solid catalyst component.

In any embodiment the one or more internal donors are non-aromatic. The non-aromatic internal electron donor may comprise an aliphatic amine, amide, ester, ether, ketone, nitrile, phosphine, phosphoramide, thioethers, thioester, aldehyde, alcoholate, carboxylic acid, or a combination thereof. In any embodiment, the non-aromatic internal electron donor(s) comprise a substituted or unsubstituted C4 to C10 or C20 di-, tri-, or tetra-ether or glycol, a substituted or unsubstituted C4 to C10 or C20 carboxylic acid or carboxylic acid ester that may include one or more ether groups, or a combination of two or more such compounds. By "substituted" what is meant is that the compound may include groups such as hydroxides, amines, silanes, or a combination thereof. In any embodiment, the one or more compounds includes secondary or tertiary carbon atoms (thus iso- or tert-hydrocarbon compounds).

In any embodiment, at least one, and in some embodiments two or more external electron donors are used in combination with the solid Ziegler-Natta catalyst component, as long as one of them is an amino-silane donor. External donors are preferably added to the polymerization reactors as a separate component along with the catalyst and activator. As used herein, an "amino-silane" donor is an external electron donor having at least one amine or alkylamine moiety and at least one silane, alkylsilane or siloxane moiety. In any embodiment the external electron donors may comprise an organic silicon compound of the general formula $R^1{}_4Si$ and/or $R^1{}_nSi(NR^2{}_2)_{4-n}$, wherein each $R^1$ is independently selected from hydrogen, C1 to C10 linear and branched alkyls and alkenes, C4 to C12 cycloalkyls and cycloalkenes, C5 to C14 aryls, C6 to C20 alkylaryls, C1 to C10 linear or branched alkoxys, C4 to C12 cycloalkoxys, C5 to C14 aryloxys, and C6 to C20 alkylaryloxys; preferably each $R^1$ is independently selected from C1 to C6 linear, branched and cyclic alkyls or alkoxys; and each $R^2$ is independently selected from hydrogen, C1 to C10 linear and branched alkyls and alkenes, C4 to C12 cycloalkyls and cycloalkenes, C5 to C14 aryls, and C6 to C20 alkylaryls; preferably each $R^2$ is independently selected from C1 to C5 linear or branched alkyls; and wherein "n" is 0, 1, 2, or 3, preferably 2 or 3, most preferably 3.

Examples of the suitable organosilicon and/or aminosilane compounds include dimethylamino-triethoxysilane, diethylamino-triethoxysilane, vinylethylamino-triethoxysilane, dipropylamino-triethoxysilane, dimethylamino-trimethoxysilane, dimethylamino-tripropylsilane, diethylamino-dicyclopentylmethoxysilane, diethylamino-dimethoxy-cyclohexyl silane, dipropylamino-vinyldimethoxysilane, trimethylmethoxysilane, trimethylethoxysilane, dimethyldimethoxysilane, dimethyldimethoxysilane, dimethyldiethoxysilane, diisopropyldiethoxysilane, t-butylmethyl-n-diethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldimethoxysilane, bisethylphenyldimethoxysilane, dicyclohexyldiethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, isobutyltriethoxysilane, phenyltriethoxysilane, γ-aminopropyltriethoxysilane, chlorotriethoxysilane, vinyltributoxysilane, cyclohexyltrimethoxysilane, cyclohexyltriethoxysilane, 2-norbornanetriethoxysilane, 2-norbornanemethyldimethoxysilane, ethyl silicate, butylsilicate, trimethylphenoxysilane, methylallyloxysilane, vinyltris(β-methoxyethoxysilane), vinyltriacetoxysilane, dimethyltetraethoxydisiloxane, tetraethoxysilane, methylcyclohexyldimethoxysilane, propyltriethoxysilane, and/or dicyclopentyldimethoxysilane.

Preferably, the external electron donor consists of only one or more amino-silane donors, and most preferably only one type of amino-silane donor. Different external electron donors may be added in the first and/or second or more loop reactors to effect the polypropylene properties such as making the polypropylene bimodal in MFR, molecular weight, crystallinity, or some other property, but most preferably only one external electron donor is added throughout, and most preferably at the same concentration. In any embodiment the combined concentration of external electron donors can be present with the catalyst and olefin monomer(s) in the reactor to within a range from 5, or 10, or 20 ppm to 80, or 100, or 120 ppm based on the total olefin concentration.

The concentration of the Ziegler-Natta catalyst in the polymerization system may be from 2, or 4, or 8 ppm to 20, or 40, or 60, or 100 ppm based on the total olefin concentration. The organoaluminum activator may be present in an amount sufficient to produce from 0.1 to 500 g, or more preferably from 0.3 to 300 g, of a polypropylene per gram of the titanium catalyst present, and may be present at from 0.1 to 100 moles, or more preferably from 0.5 to 50 moles, per mole of the titanium atom present in the catalyst component. Stated another way, the organoaluminum activator may be present to within a range from 10, or 20, or 40 ppm to 80, or 100, or 140, or 180, or 200 ppm based on the total olefin concentration.

Process Details

The slurry polymerization process used in this invention is preferably a "bulk loop slurry process." In any embodiment, the Ziegler-Natta catalyst, an activator (typically an aluminum alkyl) and external electron donor(s) are fed to a pre-polymerization reactor, either with or without a prior step to premix or "pre-contact" these components to activate the catalyst complex ahead of polymerization. The pre-polymerization reactor serves to start the reaction with the olefin, typically propylene but also ethylene or other C4 to C12 olefins, at a low temperature (preferably 10 to 30° C.) to allow a small amount of polypropylene to grow around the catalyst particles to prevent fracturing, and thus create polypropylene fines which are difficult to process, when this catalyst with polypropylene is subsequently fed into the first main loop reactor along with more olefin monomer and/or comonomers. However, in any embodiment, the pre-polymerization step is absent and the catalyst/activator/donors fed directly to the polymerization reactor(s). In any case, there may be one or two or more loop reactors in series or parallel, followed by separation equipment to remove remaining olefins from the polypropylene solids which can then be "finished" in either extrusion and pelletization equipment or loaded to containers directly as the material comes from the reactors. This is preferably when "additives" are combined with the ICP, if desired.

The polymerization to produce the polypropylene is most preferably a "single stage" polymerization process, meaning that the olefins and catalyst components, and optional hydrogen are contacted under the same or similar conditions throughout the production of the polypropylene, such as in a single reactor, or multiple reactors in parallel or series, held at a constant level of temperature, pressure, olefin concentration, and hydrogen concentration, where no parameter changes by more than ±5%, or ±10%. Thus, for example, a polymerization is single stage even if performed in two or more loop slurry reactors in parallel if the reactor conditions are held at a constant level.

In any embodiment, hydrogen may be present in the reactor to modulate the molecular weight of the polypropylene being produced. In any embodiment, the hydrogen, if combined with the single catalyst during the polymerization, is combined at a constant level. This means that the total concentration of hydrogen in the reactor is held constant during the production of the polypropylene. In any embodiment, the level of hydrogen is kept at or below the bubble point, most preferably below the bubble point of the system.

In any embodiment, the temperature of the reactor is controlled by the rate of catalyst addition (rate of polymerization), the temperature of the olefin feed stream and/or the use of heat transfer systems. For olefin polymerization, reactor temperatures can range from 50 to 120° C. or more, while pressures are generally higher than 300 psig, or within a range from 300 psig to 1000, or 1200 psig. These process conditions are in favor for in situ catalyst activation since high temperature enhances the solubility of catalysts and activators in propylene. In any embodiment, the polymerization temperature is preferably at least 50, or 60, or 70° C., or within a range from 50, or 60, or 70, or 80, or 90, or 100, or 120° C. to 130, or 140, or 150, or 160, or 170° C.

Prior to contacting with polymerization catalyst, the olefin monomers are generally purified to remove potential catalyst poisons. The feedstock may be heated or cooled prior to delivery to the first reactor. Additional olefin monomers may be added to a second reactor(s), and it may be heated or cooled.

The catalysts/activators/donors can be passed to one or more polymerization reactors in series or split between two or more reactors in parallel. In slurry polymerization, polypropylene produced remains dissolved or partially dissolved in the liquid olefin under reactor conditions. The catalyst may be passed to the reactor in solid form or as a slurry/suspension in an inert hydrocarbon solvent. Alternatively, the catalyst suspension may be premixed with the solvent in the feed stream for the polymerization reaction. Catalyst can be activated in-line, or by an activator with which it is co-supported. In some instances premixing is desirable to provide a reaction time for the catalyst components prior to entering the polymerization reactor, but this step may be absent. The catalyst activity is preferably 20,000 kg polypropylene per kg of catalyst or more, more preferably 50,000 kg polypropylene per kg of catalyst or more, even more preferably 100,000 kg polypropylene per kg of catalyst or more.

Loop reactor systems include a single reactor and multiple reactors in series or parallel configuration, such as that disclosed in US 2007/0022768. The solvent/olefin, preferably simply propylene, flow in these reactors is typically maintained using pumps and/or pressure systems, and may operate continuously by having olefin and catalyst feed at one point and extracting the forming polypropylene from another point, preferably downstream therefrom. The conditions of temperature, catalyst concentration, hydrogen concentration, and olefin concentration may be the same or different in each loop reactor and may be tailored as necessary to suit the desired end product. In any embodiment, the solution polymerization process of this disclosure uses heat exchanger types of reactors where the polymerization. The reactors can be one or more shell and tube type of heat exchangers, or one or more spiral type of heat exchanger.

Most preferably, no solvents are present in the bulk loop slurry process except for a minor amount used to initially suspend the catalyst and/or activator, and the system consists essentially of propylene and any other olefin monomers as the polymerization medium and carrier of the forming polypropylene particles. In any embodiment the reactor pressure is maintained and/or controlled using a pressurization drum, which is an apparatus containing liquid propylene and fluidly connected to the loop reactor, preferably the first loop, where the propylene is kept under pressure. The pressure of the propylene within the pressurization drum is controlled by steam-heated propylene that can enter above a pool of liquid propylene in the drum.

Thus, in any embodiment is a process comprising contacting a catalyst with propylene and optionally ethylene or C4 to C10 α-olefins in at least one slurry polymerization reactor to produce polypropylene, wherein the process further comprising (or consisting of, or consisting essentially of) continuously separating the polypropylene from the remaining propylene by first passing the polypropylene and remaining propylene from the reactor(s) to a transfer line dryer to remove a portion of the propylene, preferably continuously, followed by passing the polypropylene and remaining propylene to a high pressure separator (i.e., liquid-solid separator) whereby an amount of the remaining propylene is further separated from a first separated polypropylene and directed to a recycle line to the reactor(s); directing the first separated polypropylene to a low pressure separator (i.e., gas-solid separator) whereby any remaining propylene is further separated to obtain a second separated polypropylene and propylene which is directed to a recycle line back to the reactor(s), wherein the second separated polypropylene is passed to a purge drum, then to an extruder to form finished pellets of polypropylene. In any embodiment, the first separated polypropylene and remaining propylene is passed to the low pressure separator through a second transfer line dryer to remove an amount of propylene prior to entering the low pressure separator.

Propylene recovered from the high pressure separator is preferably recycled back to the first, second, or both loops in the reactor, with or without further compression. Also, propylene recovered from the low pressure separator is also recycled back to the first, second, or both loops reactor, preferably with compression. Most preferably, no other separation means or steps to remove polyolefin from the propylene are taken in either recycle stream.

The recovered and mostly dried polypropylene is then passed to another one or more second reactors to be further contacted with the remaining polymerization catalyst, external donor, and added comonomer, preferably ethylene thus forming an ethylene-propylene copolymer, most preferably imbedded in the continuous phase of the polypropylene. Most preferably, the second reactor or reactors is a low pressure reactor, that is, operating at under 500 (3.4), or 400 psig (2.8 MPa) such as a stirred-tank reactor, slurry reactor, solution phase reactor (stirred or circulating), gas phase reactor (GPR), plug flow reactor, etc. Most preferably the second reactor is a GPR operating at under 500 (3.4), or 400 psig (2.8 MPa).

Thus, the inventive process in any embodiment comprises (or consists of) of producing a polypropylene followed by transferring the polypropylene with still-active catalyst to one or more GPR's downstream, or with a second catalyst introduced in the GPR. During transfer, one or more separation steps may be included in order to remove liquid or gaseous propylene, diluents or other olefin monomers or process feeds or gases from the polypropylene before being fed to the GPR. Most preferably there is just one olefin/polyolefin separation step.

In any embodiment, prior to transferring the polypropylene such as through a continuous fluid conduit leading to the second reactor(s) (preferably, one or more GPR's), the polypropylene is subjected to a step to remove a desirable portion, or all, of the hydrogen. In any embodiment hydrogen is removed using a physical pressure drop and re-pressurization process, alone or in combination with a chemical reaction of hydrogen with a chemical scavenging agent. This may take place at the same time that propylene is separated from the polypropylene (a olefin/polyolefin separation step), or after removal of the propylene through a series of low-pressure vessels where more gaseous propylene and almost all of the remaining hydrogen is removed from the polymerization medium going from one reactor to another. Such systems may be referred to as cycling transfer systems (CTS).

When used, the chemical scavenging agent is a combination of a titanium-cyclopentadienyl compound activated by aluminum alkyl (either additional or the aluminum alkyl already in the polymerization medium) that reacts with excess hydrogen and effectively remove it from the stream that will enter the second polymerization stage, preferably one or more GPR's. Preferably, when the chemical scavenging agent is used it is added to the polymerization medium after one or more olefin/polyolefin separation steps, and in particular just before entering the GPR. In any embodiment, the chemical scavenging agent is injected into the GPR bed.

In the GPR, further propylene is fed to the reactor along with other olefin monomers, especially ethylene but potentially including any C2 to C10 α-olefin, to produce an amorphous copolymer to complete the ICP. The reaction in the GPR can be controlled to produce copolymers with a broad variety of compositions and molecular weight, as well as the overall percentage of copolymer within the ICP produced.

In any embodiment the ratio of comonomer to propylene can be varied to produce, in the example of ethylene-propylene copolymers, from 5, or 15 wt % to 40, or 50, or 60, or 70 wt % by weight ethylene (or other comonomer) in the ethylene-propylene copolymer. This can be controlled via the feed rate of each reactant to the GPR. Also, in any embodiment a chain termination agent, for example hydrogen, or other reactants, such as propylene hydrogenation catalysts, can be additionally fed to the GPR to produce ethylene-propylene copolymer having intrinsic viscosity (IV) values of at least 3, or 4, or 5 dL/g, or within a range from 3, or 4, or 5 dL/g to 6, or 7, or 8, or 10 dL/g.

The amount of ethylene-propylene copolymer produced in the GPR can be controlled in a variety of ways to produce ethylene-propylene copolymer content in total polyolefin ranging from 2 wt % to 30 wt % by weight, up to as high as 50 to 70 wt % by weight of the ICP. These methods include, but are not limited to: (a) varying the mass of polyolefin within the reactor, the "bed" of polyolefin, to adjust the residence time and thus extent of reaction of the polyolefin within the reactor. This is typically controlled by the rate at which material is fed to the reactor relative to the rate at which polyolefin is removed from the reactor; and (b) utilizing catalyst control agents or poisons, either independently or in combination with bed mass, to alter catalyst activity thus controlling ethylene-propylene copolymer produced.

The range of copolymers can be produced with polypropylene of broad molecular weight ranges, or of broad molecular weight distributions, or broad compositional distribution, or in any combination. Thus, the overall process allows for vast variation in final ICP composition and molecular weight combinations to produce polymers designed for many differing end uses.

The operation of the GPR is described here. In any embodiment, polypropylene produced in the first stages, such as loop slurry reactors, is passed through transfer line driers to heat the material as it passes to a olefin/polyolefin separation device such as a dust separator, preferably operating at a pressure at or near the pressure of the loop slurry reactors to avoid having to re-pressurize the olefin as the separated olefin recirculates to the loop reactors. The separated polypropylene preferably has less than 10, or 8, or 6, or 4 wt %, by weight of the polypropylene and propylene remaining. This dried polypropylene is transferred to the GPR, typically a vertical, cylindrical fluidized bed reactor having an expansion zone above the bed wherein the polypropylene is fed into the bottom or some section of the bed and gas flow rises through the bed up into the expansion zone.

Once fed into the GPR, the polypropylene and forming ethylene-propylene copolymer and other solid components are kept in a fluidized state via one of the following methods or a combination thereof. In any embodiment, recirculation of the gas from the GPR overhead to the bottom of the GPR at a high enough velocity that the polyolefin particles, or granules or powder, etc. are fluidized by the flow of gas through the polyolefin bed. This velocity is maintained high enough to fluidize the granules, but not high enough to carry granules or significant quantities of dust, or fines, overhead and along with the recirculating gas stream. In any embodiment, the gas flow up the fluidized bed is within a range from 500, or 600 klb/hr up to 1200, or 1400, or 1600, or 2000 klb/hr.

Reduction of fines carryover may also be achieved via vessel design, where the top of the reactor may be of wider diameter than the bed-containing section, creating an expansion zone to allow further reduction in gas velocity as it flows overhead. The gas then flows through a compressor or blower in series with one or more cooling exchangers and is then distributed across the diameter at the bottom of the GPR via a perforated plate or via a conical bottom design of the reactor which provides for gas distribution as the gas flows, losing velocity as the cone opens upward.

Also in any embodiment, mechanical agitation of the polyolefin bed is employed instead of, or in addition to, gaseous fluidization of the bed, which may also be maintained in a slightly wetted state via temperature control of the olefin monomer feeds added to the vessel.

In any embodiment, heat of reaction in the GPR is controlled via one of the following methods or a combination thereof: (a) cooling of the recirculating gas stream by passing the gas through a cooling exchanger after exiting the GPR overhead and either before or after reaching a compressor or blower that provides the motive force to recirculate the gas; (b) addition of pre-cooled feed streams to the reactor; (c) cooling jackets on the body of the reactor; or (d) controlled by one or more of these methods may range anywhere between 60, or 65° C. to 90, or 100° C.

In any embodiment, reactor pressure in the GPR is controlled anywhere from 100 psig up to 300, or 500 psig, depending upon the monomers employed, by adjusting reaction rate, feed rate to and venting rate from the reactor. In any embodiment, the forming ICP is removed from the vessel via piping from the bottom or side of the GPR, depending upon design specifics. This polyolefin "letdown" is controlled by control valves in the piping allowing for flow control of the exiting polyolefin and gas. A slip-stream may or may not be passed through a cyclonic vessel to assist in removing some gas from the polyolefin stream while preventing removing smaller particle size polyolefin, or fines, from the GPR to help prevent wall and/or plate fouling.

An overview of an embodiment of the inventive process is described with reference to FIG. 3, wherein a dual loop slurry reactor (first stage) fluidly connected to a single GPR (second stage) is described for the production of the polypropylene component and ethylene-propylene component, respectively, thus isolating the propylene-based impact copolymer. This particular embodiment in FIG. 3 can apply to the process as described in any embodiment herein. Some details, such as the compressors and pumps, are for illustrative purposes only and the apparatus and process is not herein limited by the type of compressors and pumps used to facility and maintain flow of the polymerization medium, monomers, and separated polyolefins and gasses.

Figure 3:
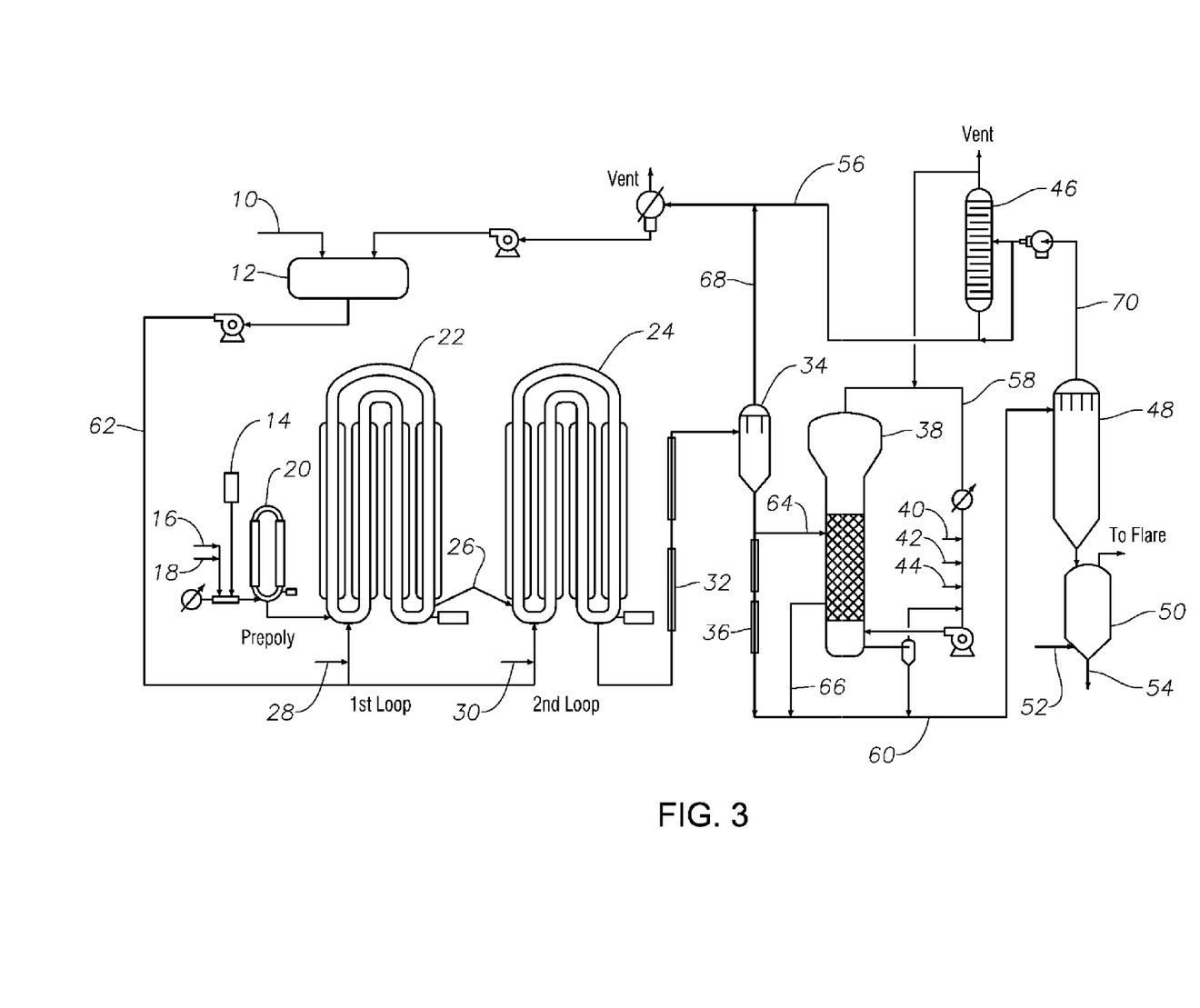
FIG. 3 is a diagram of a preferred embodiment of the process to produce the propylene-based impact copolymers described herein.

With reference to FIG. 3 is an initial olefin feed 10, preferably propylene to a feed tank 12 from which the olefin may pass through line 62 to loop slurry reactors 22 and 24, each having a circulating flow of olefin and polymerization medium therein driven by pumps. The feed the polymerization medium are catalyst feed line 14, external donor feed line 16, and activator feed line 18, each of which may feed into a pre-polymerization reactor 20 such as a smaller loop slurry, or alternatively bypass the pre-polymerization reactor 20 and flow directly, preferably premixed, into one or both of loop reactors 22 and 24, both of which are desirably fitted with water jackets to control the heat of reaction within the loops. Preferably, as shown in FIG. 3, each of the loop reactors 22 and 24 are fitted with a detecting probe, such as a nuclear density probe, to measure the density of the flowing slurry therein.

A chain terminating agent such as hydrogen may be injected into one or both loop reactors at line 28 and 30, and a fluid connection 26 exists between loop reactors 22 and 24 to allow polymerization media that may include polyolefin, preferably polypropylene, to flow from one reactor to another. The hydrogen may be present in the polymerization medium in any embodiment within a range from 500, or 1000, or 2000 mppm to 8000, or 8500, or 9000, or 9200, or 9400, or 10,000 mppm (based on the olefin feed), but preferably it is present to a level below the bubble point of the system. The injected chain terminating agent is useful in controlling the molecular weight of the forming polyolefin, but it is most preferable to keep the level of chain terminating agent, especially a compound that is typically a gas at atmospheric conditions such as hydrogen, at or below the bubble point of the reactors 22 and 24.

Polyolefin, preferably polypropylene, is continuously drawn from the loop reactors and flowed through transfer line dryer 32 to a first olefin/polyolefin separation means 34 to separate unreacted olefin from forming polyolefin, preferably to separate the propylene from polypropylene. The separated olefin can be recycled through line 68 back to the tank 12. The transfer line dryer 32 preferably heats the material flowing therein to a temperature high enough to effect vaporization of the olefin (and any optional solvent), but low enough to maintain the integrity of the polyolefin therein, such as polypropylene, such as to keep the polypropylene from becoming sticky and thus fouling the line 32 and separation means 34, such as a temperature within a range from 50° C. to 120, or 140° C. The first olefin/polyolefin separation means may be fitted with a probe such as a nuclear density probe to determine the level of polyolefin therein. Through the use of such a process, as much as 80 to 90 wt %, by weight of olefin, can be separated from the polyolefin and flowed back to the feed tank through use of a liquid pump. Most preferably, the pressure within this process is maintained or only drops by no more than 5 or 10% of the pressure within the loop reactors 22 and 24. This can be accomplished most preferably using an olefin/polyolefin separation means 34 such as a so-called high pressure separator. For instance, a cylindrical dust collector device can be used for such separation, allowing for the removal of 80 to 90% of the olefin and passing relatively dry polyolefin, preferably polypropylene, to the GPR 38.

Prior to the forming polyolefin being transferred from the loop reactors 22 and 24 to the GPR 38, hydrogen that was added to the polymerization medium in the loop reactors is desirably reduced or removed as described above. Such removal may occur prior to the polymerization medium reaching the first olefin/polyolefin separation means 34, within the separation means 34, or after leaving the separation means 34 prior to transfer to the GPR 38. In any embodiment, the hydrogen can be removed once the polymerization medium is within the GPR 38. One embodiment of removing the hydrogen is disclosed in WO 2017/034772.

In any embodiment, the polypropylene may be passed to the GPR 38 through line 64 in FIG. 3 to form the propylene-based impact copolymer described herein, or alternatively may be passed through a second transfer line dryer 36 then to line 60 to a second olefin/polyolefin separation means 48, then to a purge bin 50 preferably fitted with a counter flow of nitrogen and/or water vapor through the bottom at line 52. This pathway is the preferred route if just forming the polypropylene.

In forming the ICP, in any embodiment the polyolefin from the first olefin/polyolefin separation means 34 passes to the GPR 38 through line 64, preferably line 64 fluidly connected to the GPR at some point along the reactor within which the fluidized bed is located (hash-marked section of GPR 38 in FIG. 3), and where gases including hydrogen, and olefin monomer are fed, most preferably ethylene and additional (if necessary) propylene through lines 40, 42 and 44. By using this process, ethylene-propylene copolymer can be formed using the same catalyst and external donor injected at lines 14, 16 and 18, all in the presence of the already formed polypropylene. The forming ethylene-propylene copolymer forms within the interstitial pockets and pores of the polypropylene particles, thus forming an intimate, heterogeneous solid mixture comprising a continuous phase of polypropylene and domains of ethylene-propylene copolymer. The forming ICP can then be withdrawn from the reactor when desired through line 66 to feed into line 60 for further olefin/polyolefin separation and finishing.

Also, the ICP can be recirculated through line 58 back to the GPR 38 to further grow the impact copolymer particle. When the particles are a desirable size, they can be transferred through line 66 to line 60 to a second olefin/polyolefin separation means 40, such as a long-retention time dust collector, to further separate olefin from polymer. Both the separation means 48 and purge bin 50 may additionally be fitted with a probe(s) such as a nuclear density probe(s) to determine the level of polyolefin therein. Final propylene-based impact copolymer may be obtained from line 54 for further processes such as by extrusion to form pellets of material, preferably blended with common additives as is known in the art.

The remaining olefin removed from the second olefin/polyolefin separation means 48 may be flowed through line 70 to a distillation or separation means 46 to separate ethylene from propylene, or other olefins as necessary, and either vented, recycled to the GPR 38 through line 58, or through line 56 back to the feed tank 12, as shown in FIG. 3.

Thus in any embodiment is a process to produce polyolefins comprising combining olefins with a polymerization catalyst and hydrogen in the presence of at least one aminosilane donor to form a polymerization medium, the process comprising at least a first stage and a second stage, wherein hydrogen is removed from the polymerization medium prior to transferring the polymerization medium from the first stage the second stage. In any embodiment the combining takes place at or below the bubble point.

In any embodiment the process further consists of two olefin/polyolefin separations steps, most preferably using a first olefin/polyolefin separation means and a second olefin/polyolefin separation means as described with respect to FIG. 3.

Described as an apparatus, in any embodiment is a polymerization apparatus comprising (or consisting essentially of) at least one liquid or slurry polymerization reactor 22 and 24; at least one second reactor 38 fluidly connected and in series 32 with the at least one liquid or slurry polymerization reactor; a first olefin/polyolefin separation means 34 located within the fluid connection; and a second olefin/polyolefin separation means 48 fluidly connected downstream of the at least one second reactor.

In any embodiment of the apparatus, the at least one second reactor is at least one low pressure reactor.

In any embodiment of the apparatus, the at least one second reactor is a gas phase reactor.

In any embodiment of the apparatus, the first olefin/polymerization separation means operates at a pressure above the second reactor.

Finally, in any embodiment of the apparatus, the second olefin/polymerization separation means operates at a pressure at or below the second reactor. Most preferably, there is a transfer line dryer associated with the fluid connection between the at least one liquid or slurry polymerization reactor, and at transfer line dryer associated with the fluid connection between the second reactor and the second olefin/polyolefin separation means.

The first olefin/polymerization separation means in any embodiment operates at a pressure of at least 200 psi, or 250 psi, or 300 psi, or within a range from 200, or 250 or 300 psi to 400, or 500 psi. In any embodiment the first separation means is a high pressure dust collector, which may be any type of common cylindrical dust collector fitted to operate at the desired pressure. In any embodiment it is a cylindrical column with a conical bottom, allowing for tangential entry of solids/gas at the side, the top having internal downward tubes/filter bags, allowing the solids settle in the bottom of the vessel by gravity, and the propylene gas pass through a filter system at the top which could be filter cartridges, socks, or panels. Any dust/solids captured on the filters is forced back down into the solids stream by a back flush or back-pulse system. The solid polymer then flows continuously through a secondary transfer line dryer/heater to the low pressure dust collector.

In any embodiment the second olefin/polymerization separation means operates below about 50, or 40, or 20 psi, or within a range from 5, or 10 psi to 20, or 40, or 50 psi. In any embodiment the second olefin/polymerization separation means is a low pressure dust collector. In any embodiment the low pressure dust collector is a cylindrically shaped drum similar to the high pressure dust collector except that it operates at lower pressures. Entrained polymer and propylene enter the low pressure dust collector tangentially, solid polymer particles drop to the conical vessel bottom, and remaining propylene leaves from the top. The low pressure separator does not necessarily have an integral filter/dust-collection system. The polymer solids then flow by gravity out of the bottom to a purge drum with counter flowing nitrogen and water vapor to deactivate the catalyst and co-catalyst and remove the decomposition products from the final polymer product. The final polymer product is then sent to one or more extruders for finishing.

In any embodiment herein, the process provides for the combining of components that make up the polymerization medium to occur at a pressure of less than 1000 (6.9), or 800 (5.5), or 600 psig (4.1 MPa); or within a range from 200 (1.4), or 400 (2.8), or 500 (3.4 MPa) psig to 600 (4.1), or 800 (5.5), or 1000 psig (6.9 MPa). Pressure ranges are particularly preferably in loop slurry reactors as are described herein. Also in any embodiment, the combining, preferably in the loop slurry reactors, occurs at a hydrogen concentration of less than 10,000, or 9400, or 9200, or 9000, or 8500, or 8000 mppm (based on olefin feed); or within a range from 500, or 1000, or 2000 mppm to 8000, or 8500, or 9000, or 9200, or 9400, or 10,000 mppm. Finally, in any embodiment the combining, preferably in the loop slurry reactors, occurs at a temperature within a range from 50, or 60° C. to 75, or 80, or 90, or 100, or 120° C.

In any embodiment, the olefins comprise C2 to C10 α-olefins, preferably at least 80 wt % propylene and less than 20 wt % ethylene. Most desirably, the olefins comprise propylene, and optionally a minor amount of ethylene in the first stage, and include a higher ratio of ethylene to propylene in the second stage when used.

In particular, in any embodiment, the olefins comprise propylene, thus producing polypropylene; wherein the at least one first stage is a solution or slurry polymerization process and the at least one second stage is a gas phase polymerization process, and wherein there is only one olefin/polyolefin separation step between the first and second stages.

Described another way, in any embodiment is a process of polymerizing olefins comprising (consisting essentially of) combining propylene with a polymerization catalyst, hydrogen, and at least one amino-silane donor to form polypropylene in a polymerization medium under solution or slurry conditions at or below the bubble point; removing hydrogen from the polymerization medium; transferring the polymerization medium to a GPR and further combining with ethylene; and obtaining a propylene-based impact copolymer comprising an ethylene-propylene copolymer in a continuous phase of polypropylene and having a melt flow rate of at least 60 g/10 min.

Described in yet another way, in any embodiment is a process of polymerizing olefins comprising (or consisting essentially of) combining propylene with a polymerization catalyst, hydrogen, and at least one external electron donor to form polypropylene in a first polymerization medium under solution or slurry conditions at or below the bubble point; removing hydrogen from the first polymerization medium; providing a first olefin/polyolefin separation step to form a second polymerization medium; transferring the second polymerization medium to at least one GPR and further combining with ethylene; obtaining a propylene-based impact copolymer comprising an ethylene-propylene copolymer in a continuous phase of polypropylene; and providing a second olefin/polyolefin separation step. Preferably, the at least one external electron donor is an amino-silane donor.

Figure 2:
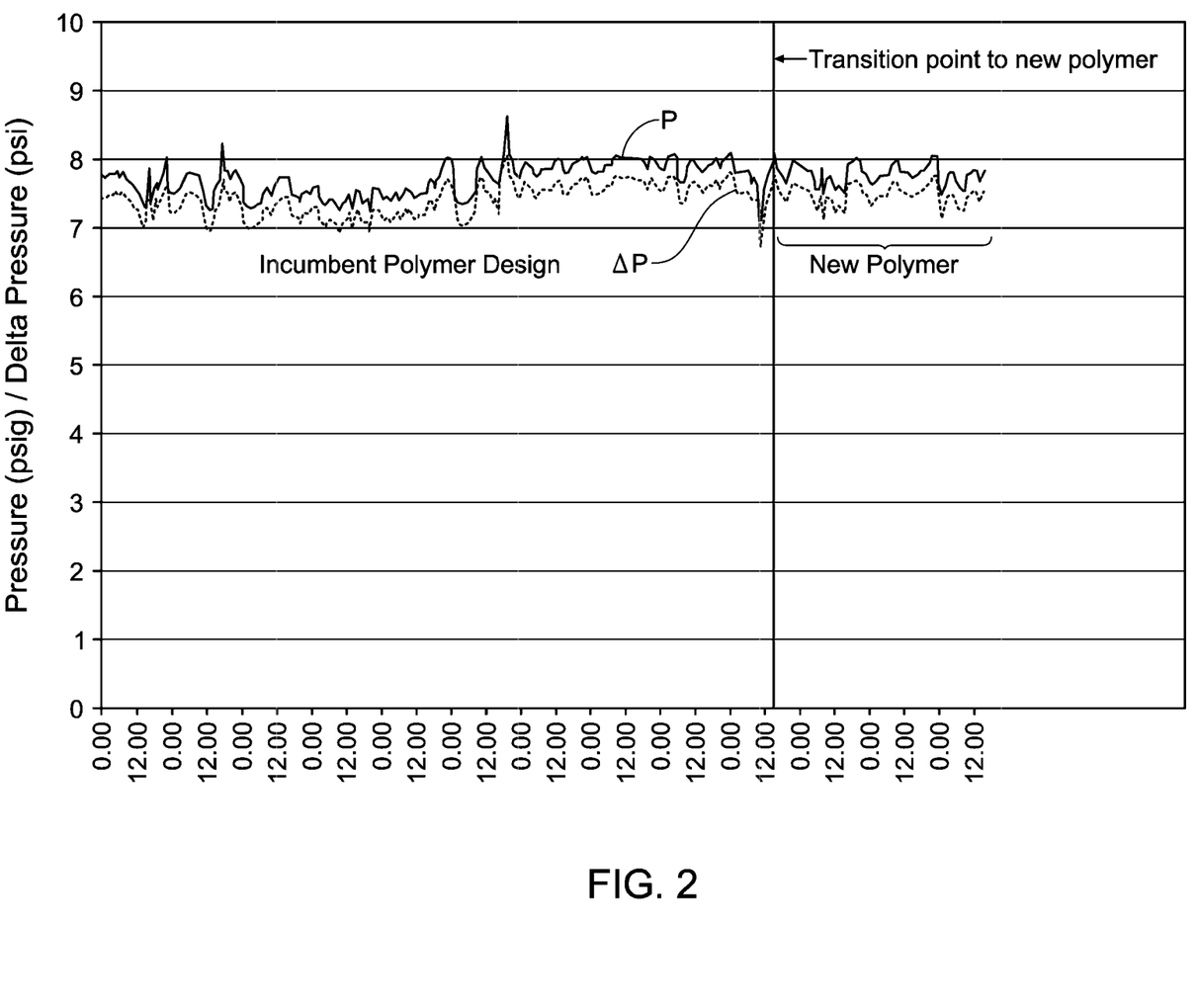
FIG. 2 is a plot of the pressure (and change in pressure, "ΔP") in the polymerization system as a function of time (general indication in hours), showing how a transition in production does not upset the system.

In any embodiment of the inventive process, due to the advantages of the invention, reactor continuity is maintained to within ±5 or 10% of the average pressure level. This is demonstrated for example by the pressure data in FIG. 2.

Thus, described with reference to FIG. 3 is a process of polymerizing olefins (supplied through olefin line 10) comprising (or consisting essentially of) combining propylene with a polymerization catalyst (line 14), hydrogen (lines 28 and/or 30), and at least one external electron donor (line 16) to form polypropylene in a first polymerization medium under solution or slurry conditions at or below the bubble point (contained in loop reactors 22 and 24); removing hydrogen from the first polymerization medium (prior to entering separation means 34, simultaneously with entering 34, or after and in the GPR 38); providing a first olefin/polyolefin separation step (separation means 34) to form a second polymerization medium; transferring the second polymerization medium (through line 64) to at least one GPR 38 and further combining with ethylene (42 and/or 44); obtaining a propylene-based impact copolymer comprising an ethylene-propylene copolymer in a continuous phase of polypropylene (transferring through line 66 into line 60); and providing a second olefin/polyolefin separation step (separation means 48).

Impact Copolymer

In any embodiment is also disclosed a propylene-based impact copolymer comprising within the range from 5, or 8 wt % to 20, or 25, or 30 wt % of an ethylene-propylene copolymer, by weight of the propylene-based impact copolymer, imbedded in a continuous phase of polypropylene. In any embodiment, the ethylene-propylene copolymer comprises within the range from 25, or 30, or 35 wt % to 40, or 45, or 50, or 55 wt % ethylene-derived units (or other C4 to C10 α-olefin, but most preferably ethylene) by weight of the ethylene-propylene copolymer. Most preferably, the propylene-based impact copolymer is made by a process described herein. The inventive ICP's tend to comprise an ethylene-propylene copolymer component with a high viscosity, high molecular weight, and a large amount of high molecular weight component, while the polypropylene portion of the ICP tends to have low molecular weight and a high MFR.

In any embodiment, the ICP's have an MFR of at least 60, or 80, or 100 g/10 min, or within a range from 60, or 80, or 100 g/10 min to 130, or 140, or 160, or 180, or 200 g/10 min. In any embodiment, the ICP's described herein have an Mw/Mn within a range from 10, or 12, or 14 to 20, or 24, or 26, or 30. Also in any embodiment the ICP's have an z-average molecular weight (Mz) value of greater than 2800, or 3000, or 3200 kg/mole, or within a range from 2800, or 3000, or 3200 kg/mole to 3600, or 3800, or 4000, or 4200 kg/mole In any embodiment, the ICP's described herein have a ratio of $Mw_{(EP)}/Mw_{(PP)}$ of greater than 5, or 6, or 10, or within a range from 5, or 6, or 10 to 14, or 16, or 20.

In any embodiment, the polypropylene portion of the ICP has an MFR of at least 100, or 120, or 160, or 200, or 220, or 260, or 300 g/10 min; or within a range from 100, or 120, or 160, or 200, or 220, or 260, or 300 g/10 min to 340, or 360, or 400, or 420, or 480, or 500 g/10 min. Also, in any embodiment the polypropylene has a pentad fraction greater than 0.95, or 0.96 by $^{13}C$ NMR, and a triad fraction greater than 0.97, or 0.975, or 0.98 by $^{13}C$ NMR. In any embodiment the polypropylene has an Mw/Mn within a range from 4, or 6 to 8, or 10, or 12; and in any embodiment the polypropylene has an Mz/Mw of less than 5, or 4.8, or 4.2, or 4, or within a range from 2.5, or 3, or 3.2 to 4, or 4.2, or 4.8, or 5.

In any embodiment the ethylene-propylene copolymer portion of the ICP has an Mw/Mn within a range from 6, or 8, or 10 to 14, or 16, or 20. Also in any embodiment the ethylene-propylene copolymer has an Mz value of greater than 3000, or 3200, or 3400 kg/mole, or within a range from 3000, or 3200, or 3400 kg/mole to 3800, or 4000, or 4200, or 4400 kg/mole. In any embodiment, the ethylene-propylene copolymer has an Mz/Mw value of less than 4, or 3.5, or 3, or within a range from 2.2, or 2.4 to 3, or 3.5, or 4, or 5. Finally, in any embodiment the ethylene-propylene copolymer has an intrinsic viscosity (IV) within a range from 3, or 4 dL/g to 7, or 8, or 10 dL/g.

Also, in any embodiment, the ethylene-propylene copolymer portion of the ICP has a glass transition temperature within a range from −30, or 40, or −45° C. to −55, or −60, or −65° C. as measured by DSC according to ISO 6721-7 at a compression molded sample consisting of the ethylene-propylene copolymer fraction as isolated by, for instance, xylene extraction using a soxhlet extractor.

The inventive ICP's typically have a Rockwell hardness within a range from 95, or 95 to 105 or 110 or 120. The inventive ICP's also typically have a heat deflection temperature (HDT) (0.45 MPa) within a range from 90, or 100, or 110° C. to 120, or 130, or 140° C.; and within a range from 50, or 55° C. to 70, or 75, or 80° C. (1.8 MPa).

In any embodiment, the propylene-based impact copolymers have a flexural modulus of at least 1600, or 1660, or 1700 MPa, or within a range from 1600, or 1660, or 1700 MPa to 1800, or 1840, or 1880, or 1900, or 1940, or 2000 MPa. In any embodiment, the propylene-based impact copolymers also have a notched Izod impact strength of at least 3, or 3.2, or 3.6, or 4, or 4.2, or 4.6 kJ/m$^2$, or within a range from 3, or 3.2, or 3.6, or 4, or 4.2, or 4.6 kJ/m$^2$ to 5.2, or 5.4, or 5.6, or 5.8, or 6, or 6.2 kJ/m$^2$.

Described in a particular embodiment is an impact copolymer having an MFR within a range from 50 to 80 g/10 min; wherein the hPP portion has an MFR within a range from 80 to 120 g/min; and wherein the EP copolymer content is within a range from 8 to 14 wt % relative to the weight of the impact copolymer. Preferably, the ethylene content (amount of ethylene-derived units) in the EP copolymer is within a range from 38 to 46 wt % relative to the weight of the EP copolymer. The EP copolymer portion of the impact copolymer preferably has an intrinsic viscosity (IV) within a range from 2.4 to 3.2 dl/g; and the EP copolymer portion preferably has an $M_n$ within a range from 50 to 55 kg/mol, an Mw within a range from 340 to 400 kg/mol, and an Mz within a range from 1,000 to 1,400 kg/mol as measured by GPC. The hPP portion of the impact copolymer preferably has an $M_n$ within a range from 20 to 35 kg/mol, an Mw within a range from 120 to 160 kg/mol, and an $M_z$ within a range from 450 to 550 kg/mol as measured by GPC. Also, the hPP portion of the impact copolymer has an isopentad content of 94 to 96 mol %; and preferably the hPP has a polydispersity index (PI) of 4 to 6. The impact copolymer preferably has an intrinsic viscosity (IV) ratio of EP copolymer over hPP within a range from 2.2 to 2.8. And the overall GPC characteristics of the impact copolymer preferably comprise an $M_n$ within a range from 25 to 30 kg/mol, an $M_w$ within a range from 170 to 200 kg/mol, and an $M_z$ within a range from 850 to 1,000 kg/mol.

Here, the PI values is a measurement of molecular weight distribution of the polymer measured by a rheological technique wherein the modulus separation at low modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation: 54.6·(modulus separation)$^-$$_{1.76}$, wherein the modulus separation (MS) is defined as (frequency at G'=500 Pa)/(frequency at G"=500 Pa), wherein G' is the storage modulus and G" is the loss modulus.

Desirable polymers used to blend with the ICP include propylene-based elastomers, plastomers, EPDM, ethylene-propylene rubber, polyethylenes (LLDPE, HDPE, LDPE), homopolypropylene, styrenic block copolymers, hydrocarbon resins, cyclic-olefin copolymers, polyacrylates, polyesters, butyl rubber, polyisobutylene, and polyisoprene. Such blends may be used in desirable articles of manufacture.

The ICP's described herein are suitable for use in processes such as injection molding, blow molding and thermoforming for making useful articles for automotives and appliances, as the relatively high MFR provides for ease of processing, while the desirable physical properties are maintained. In particular, the inventive ICP's can be formed into automotive components, either alone or in a mixture with other polymers, exemplary components can include the interior dashboard, interior side trim, handles, interior door facing and components, exterior bumpers, wheel trim, and various fascia used for decorative purposes.

The various descriptive elements and numerical ranges disclosed herein for the inventive processes, apparatus, and impact copolymers can be combined with other descriptive elements and numerical ranges to describe the invention(s); further, for a given element, any upper numerical limit can be combined with any lower numerical limit described herein, including the examples in jurisdictions that allow such combinations. The features of the invention(s) are demonstrated in the following non-limiting examples.

EXAMPLES

Figure 1:
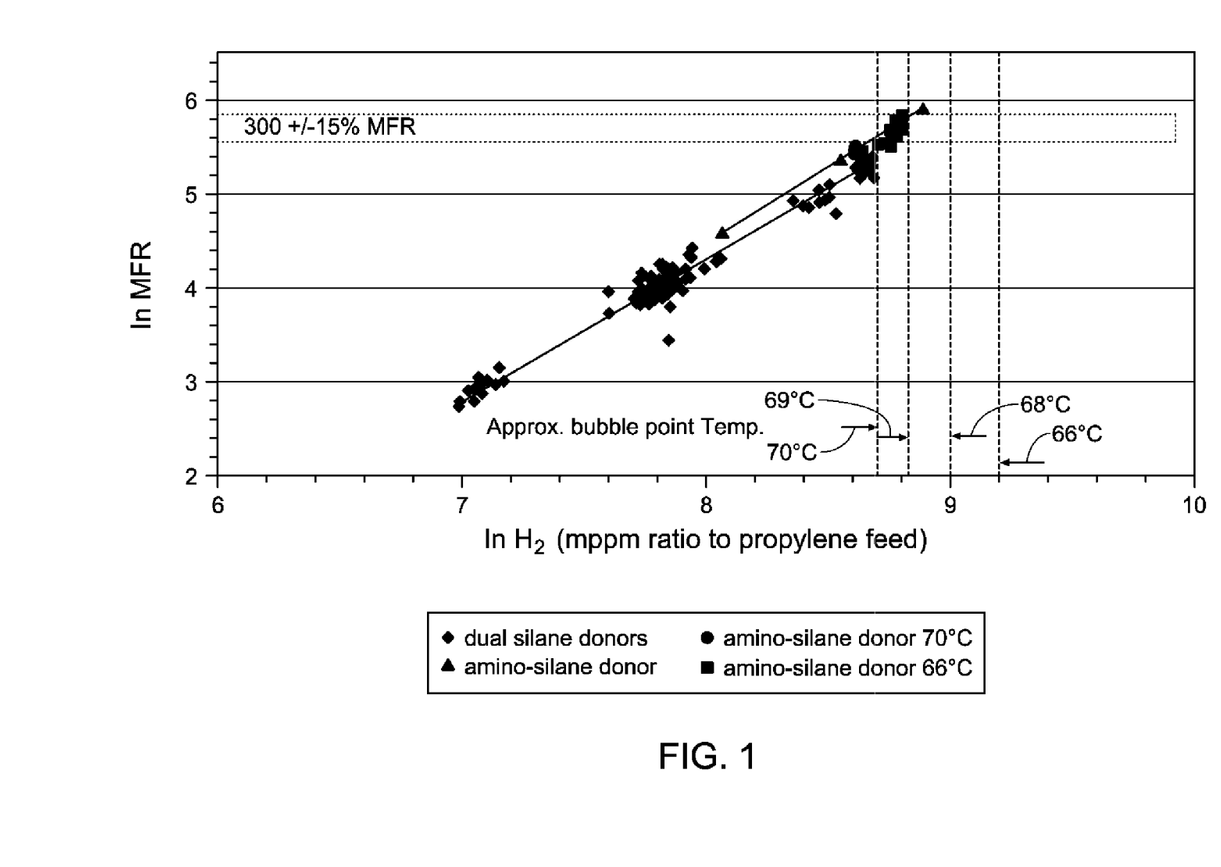
FIG. 1 is a plot of the natural log of the MFR of an ICP as a function of the hydrogen concentration (natural log) using a prior art dual silane donor and inventive aminosilane donor.

Propylene was combined with an amino-silane donor, diethylamino-triethoxysilane, 6600 mppm hydrogen (relative to the propylene and other olefins), and 10 ppm titanium/magnesium-based Ziegler-Natta catalyst (relative to the propylene and other olefins) in a slurry-type polymerization reactor. A polypropylene was produced in a series of two continuous flow loop reactors. The amino-silane donor was present at 40 ppm, an aluminum alkyl (triethylaluminum) was present at 100 ppm (relative to the propylene and other olefins), and the components were combined at a temperature of 70° C. and pressure of 500 psig (3.4 MPa). The loop reactor pressure and temperature was maintained such that the system remained at or below the bubble point, such as shown in FIG. 1.

The polypropylene that was produced in the loop reactors was then transferred to a downstream GPR to add an ethylene-propylene copolymer to produce the final impact copolymer product. Hydrogen was removed from the polypropylene containing slurry by a cycling pressure method prior to re-pressurizing and entering the GPR. Two exemplary ICP products were generated and characterized as described in Table 1 and Table 2 below. The properties of the polypropylene (hPP) were effected by varying the hydrogen concentration in the reactor, and the properties of the ethylene-propylene copolymer (EP) were effected by controlling the GPR bed weight as well as addition of catalyst poisons (e.g., oxygen, alkyl sulfonates, carbon monoxide, carbon dioxide, glycolic esters, and other known poisons), in conjunction with control of the olefin feed rate to the GPR.

Polymerization reactor continuity was maintained to within ±5, or 10% of the average pressure level when the polymerization reactor was charged with additional hydrogen (and other factors) to effect a change in the polyolefin product. This is demonstrated in FIG. 2 where the first two-thirds of the data show one product being made, followed by addition of hydrogen, change in external donor, and adjustments to the GPR in the final third of the run, where little to no change in the average pressure is evident. This demonstrates the usefulness of the use of the amino-silane as well as the olefin/polyolefin separation means.

TABLE 1

Chemical characteristics of propylene-based impact copolymer

| Measured Chemical Properties | Example 1 | Example 2 |
|---|---|---|
| ICP Mn (kg/mole) | 16 | 15 |
| ICP Mw (kg/mole) | 277 | 241 |
| ICP Mz (kg/mole) | 3,270 | 2,970 |
| Mw/Mn ICP | 17.6 | 16.1 |
| EP Mn (kg/mole) | 115 | 92 |
| EP Mw (kg/mole) | 1,357 | 1,299 |
| EP Mz (kg/mole) | 3,734 | 3,676 |
| Mw/Mn EP | 11.8 | 14.2 |
| hPP Mn (kg/mole) | 15 | 16 |
| hPP Mw (kg/mole) | 106 | 111 |
| hPP Mz (kg/mole) | 407 | 425 |
| Mw/Mn hPP | 7.1 | 6.9 |
| Mw ratio, $Mw_{(EP)}/Mw_{(hPP)}$ | 12.8 | 11.7 |
| MFR ICP (g/10 min) | 120 | 132 |
| MFR hPP (g/10 min) | 332 | 294 |
| wt % EP in ICP | 11.4 | 9.7 |
| wt % ethylene in EP | 37 | 38 |
| EP (IV), dL/g | 5.2 | 5.2 |
| Pentad of hPP (C-13 NMR) | 0.975 | 0.968 |
| Triads of hPP (C-13 NMR) | 0.981 | 0.976 |

The test methods are described below, where the total amount of ethylene in the ICP was determined by IR spectrometry, and the total content of the ethylene-propylene copolymer in the final ICP was determined by $^{13}C$ NMR. The weight percent ethylene (wt %) in the ethylene-propylene copolymer is the product of those two values.

IR Spectrometry.

Total ethylene content of the ICP was determined using a Nicolet 6700 FTIR. The granular ICP from the reactor was first extruded and pelletized. Pellet samples were compression molded into a 10 mil thick pad. The pressed pad was placed in the instrument such that the IR beam passes through the pad and then measures the remaining signal on the other side. Methyl groups from the propylene affect the absorption, so the machine was calibrated to a range of ethylene content.

Carbon-13 Nuclear Magnetic Resonance.

Characterization by NMR was accomplished as described by J. C. Randall in "Polymer Sequence Determination by $^{13}C$ NMR Method" (1977). The instrument used was a Bruker 600 MHz with a cryoprobe, calibrated using a mixture of 1,2,4-trichlorobenzene and deuterobenzene. NMR data of the olefin-block copolymer were measured by dissolving 200±1 mg of sample in 3 ml of deuterated-1,2,4-trichlorobenzene (TCE-d2). The samples were dissolved in a 10 mm NMR tube at 120° C. until the sample was dissolved. Carbon-13 NMR spectra references the polypropylene peak at 21.83 ppm or the solvent peak at 74.3 ppm depending on the tacticity of the sample.

Intrinsic Viscosity (IV).

The intrinsic viscosity (IV) values were measured according to ISO 1628-3:2010.

Melt Flow Rate.

Determined according to ASTM D1238, at 2.16 kg and 230° C.

Molecular Weight Determinations.

The distribution and the moments of molecular weight (Mw, Mn, Mz, and Mw/Mn) in Table 1 were determined by using a high temperature Gel Permeation Chromatography (Polymer Char GPC-IR) equipped with a multiple-channel band-filter based Infrared detector IR5, an 18-angle light scattering detector and a viscometer (not used here). Three Agilent PLgel 10 µm Mixed-B LS columns were used to provide polyolefin separation through size exclusion. Aldrich reagent grade 1,2,4-trichlorobenzene (TCB) with 300 ppm of the antioxidant butylated hydroxytoluene was used as the mobile phase. The TCB mixture was filtered through a 0.1 µm polytetrafluoroethylene filter and degassed with an online degasser before entering the GPC instrument. The nominal flow rate was 1.0 mL/min and the nominal injection volume was 200 µL. The whole system including transfer lines, columns, detectors were contained in an oven maintained at 145° C. A given amount of polyolefin sample was weighed and sealed in a standard vial with 80 µL flow marker (heptane) added to it. After loading the vial in the auto-sampler, polyolefin was automatically dissolved in the instrument with 8 mL added TCB solvent. The polyolefin was dissolved at 160° C. with continuous shaking for about 1 hour for most polyethylene samples or 2 hour for polypropylene samples. The TCB densities used in concentration calculation were 1.463 g/ml at room temperature and 1.284 g/ml at 145° C. The sample solution concentration was from 0.2 to 2.0 mg/ml, with lower concentrations being used for higher molecular weight samples.

The concentration "c" at each point in the chromatogram was calculated from the baseline-subtracted IR5 broadband signal intensity "I" using the following equation:

$$c = \beta I,$$

where β is the mass constant determined with polyethylene or polypropylene standards. The mass recovery was calculated from the ratio of the integrated area of the concentration chromatography over elution volume and the injection mass which is equal to the pre-determined concentration multiplied by injection loop volume.

The conventional molecular weight (IR molecular weight "M") was determined by combining universal calibration relationship with the column calibration which was performed with a series of mono-dispersed polystyrene (PS) standards ranging from 700 g/mole to 10,000,000 g/mole. The molecular weight "M" at each elution volume was calculated with following equation:

$$\log M = \frac{\log(K_{PS}/K)}{a+1} + \frac{a_{PS}+1}{a+1} \log M_{PS},$$

where the variables with subscript "PS" stands for "polystyrene" while those without a subscript are for the test samples. In this method, $a_{PS}$=0.67 and $K_{PS}$=0.000175 while "a" and "K" are calculated from a series of empirical formula established in the literature (T. Sun, P. Brant, R. R. Chance, and W. W. Graessley, 34(19) Macromolecules 6812-6820 (2001)). Specifically, the value of a/K is 0.695/0.000579 for polyethylene and 0.705/0.0002288 for polypropylene. Molecular weight is expressed in g/mole or kg/mole. The values for Mw are determined±500 g/mole, and for Mn±100 g/mole.

TABLE 2

Physical characteristics of propylene-based impact copolymer

| Measured Physical Properties | Example 1 | Example 2 |
|---|---|---|
| Flexural modulus of ICP per ISO 178, MPa | 1780 | 1860 |
| Notched Izod Impact Strength of ICP at 23° C. (kJ/m²) | 5 | 4.2 |
| Notched Charpy Impact Strength of ICP at 23° C. (kJ/m²) | 4.5 | 3.9 |
| Rockwell Hardness of ICP (R-scale) | 105 | 107 |

TABLE 2-continued

Physical characteristics of propylene-based impact copolymer

| Measured Physical Properties | Example 1 | Example 2 |
|---|---|---|
| Heat Deflection Temperature of ICP tested at 0.45 MPa (° C.) | 112 | 114 |
| Heat Deflection Temperature of ICP tested at 1.8 MPa (° C.) | 65 | 66 |

Sample Preparation.

For the physical testing of the example materials, specimens were prepared either per ASTM D4101 or per ISO 19069-2.

Flexural Modulus.

The flexural modulus reported in Table 2 was the chord (slope determined at 0.05% to 0.25% flexural strain) tested at 2 mm/min strain rate per ISO 178.

Notched Izod impact strength.

Measured per ASTM D256A or ISO 180/1A, using equipment made by TMI Testing Machines, Inc.

Notched Charpy Impact Testing.

Measured per ISO 179/1eA, using equipment made by TMI Testing Machines, Inc.

Heat Deflection Temperature (HDT).

Measured according to ISO 75-2/A using a load of 1.8 MPa, or ISO 75-2/Bf, using a load of 0.45 MPa.

Rockwell Hardness.

Measured per ASTM D785 on a 0.125 inch thickness and 3.5 inch diameter round disk.

The combination of high molecular weight ethylene-propylene copolymer with the high MFR polypropylene in the inventive ICP results in unique product properties advantageous to applications where stiffness and impact properties are both valued, such as in automotive or consumer appliance applications. The inventive process provides an avenue to further improving upon the MFR capability of existing polypropylene processes for these applications. The simplified olefin/polyolefin separation steps and associated apparatus make the overall process more efficient and cost effect without additional reactor upset when conditions are changed.

Having described the various features of the inventive process(s) and polymer(s), described here in numbered paragraphs is:

P1. A process to produce polyolefins comprising (or consisting essentially of) combining olefins with a polymerization catalyst and hydrogen in the presence of at least one amino-silane donor to form a polymerization medium, the process comprising at least a first stage and a second stage, wherein hydrogen is removed from the polymerization medium prior to transferring the polymerization medium from the first stage the second stage.

P2. The process of numbered paragraph 1, further consisting of two olefin/polyolefin separations steps.

P3. The process of numbered paragraphs 1 or 2, wherein the combining occurs below the bubble point.

P4. The process of any one of the previous numbered paragraphs, wherein the olefins comprising C2 to C10 α-olefins, preferably at least 80 wt % propylene and less than 20 wt % ethylene.

P5. The process of any one of the previous numbered paragraphs, wherein the olefins comprise propylene, thus producing polypropylene; wherein the at least one first stage is a solution or slurry polymerization process and the at least one second stage is a gas phase polymerization process, and wherein there is only one olefin/polyolefin separation step between the first and second stages.

P6. A process of polymerizing olefins comprising (or consisting essentially of):
combining propylene with a polymerization catalyst, hydrogen, and at least one external electron donor to form polypropylene in a first polymerization medium under solution or slurry conditions at or below the bubble point;
removing hydrogen from the first polymerization medium;
providing a first olefin/polyolefin separation step to form a second polymerization medium;
transferring the second polymerization medium to at least one gas phase reactor and further combining with ethylene;
obtaining a propylene-based impact copolymer comprising an ethylene-propylene copolymer in a continuous phase of polypropylene; and
providing a second olefin/polyolefin separation step.

P7. The process of numbered paragraph 6, wherein the external electron donor is at least one amino-silane donor.

P8. The process of any one of the previous numbered paragraphs, wherein the amino-silane is selected from structures comprising $R^1{}_n Si(NR^2{}_2)_{4-n}$, wherein each $R^1$ is independently selected from hydrogen, C1 to C10 linear and branched alkyls and alkenes, C4 to C12 cycloalkyls and cycloalkenes, C5 to C14 aryls, C6 to C20 alkylaryls, C1 to C10 linear and branched alkoxys, C4 to C12 cycloalkoxys, C5 to C14 aryloxys, and C6 to C20 alkylaryloxys; and each $R^2$ is independently selected from hydrogen, C1 to C10 linear and branched alkyls and alkenes, C4 to C12 cycloalkyls and cycloalkenes, C5 to C14 aryls, and C6 to C20 alkylaryls; and wherein "n" is 0, 1, 2, or 3.

P9. The process of any one of the previous numbered paragraphs, wherein the combining occurs at a pressure of less than 1000 (6.9), or 800 (5.5), or 600 psig (4.1 MPa); or within a range from 200 (1.4), or 400 (2.8), or 500 (3.4 MPa) psig to 600 (4.1), or 800 (5.5), or 1000 psig (6.9 MPa).

P10. The process of any one of the previous numbered paragraphs, wherein the combining occurs at a hydrogen concentration of less than 10,000, or 9400, or 9200, or 9000, or 8500, or 8000 mppm (based on olefin feed); or within a range from 500, or 1000, or 2000 mppm to 8000, or 8500, or 9000, or 9200, or 9400, or 10,000 mppm.

P11. The process of any one of the previous numbered paragraphs, wherein the combining occurs at a temperature within a range from 50, or 60° C. to 75, or 80, or 90, or 100, or 120° C.

P12. The process of any one of the previous numbered paragraphs, wherein the hydrogen is removed using a physical pressure drop and re-pressurization method or chemical reaction of hydrogen with a chemical scavenging agent, or both.

P13. The process of any one of numbered paragraphs 6 to 12, wherein the propylene-based impact copolymer has a melt flow rate of at least 60, or 80, or 100 g/10 min; or within a range from 60, or 80, or 100 g/10 min to 130, or 140, or 160, or 180, or 200 g/10 min.

P14. The process of any one of numbered paragraphs 6 to 13, wherein the polypropylene has a MFR of at least 100, or 120, or 160, or 200, or 220, or 260, or 300 g/10 min; or within a range from 100, or 120, or 160, or 200, or 220, or 260, or 300 g/10 min to 340, or 360, or 400, or 420, or 480, or 500 g/10 min.

P15. The process of any one of numbered paragraphs 6 to 14, wherein the propylene-based impact copolymer has an ethylene-propylene copolymer to polypropylene weight average molecular weight ratio ($Mw_{(EP)}/Mw_{(PP)}$) of greater than 5, or 6, or 10, or within a range from 5, or 6, or 10 to 14, or 16, or 20.

P16. The process of any one of numbered paragraphs 6 to 15, wherein the amount of propylene-based impact copolymer particles of an average particle diameter of less than 200 μm is less than 1, or 0.5, or 0.1 wt % by weight of the propylene-based impact copolymer.

P17. The process of any one of numbered paragraphs 6 to 16, wherein the polypropylene has a pentad fraction greater than 0.95, or 0.96 by $^{13}C$ NMR.

P18. The process of any one of numbered paragraphs 6 to 17, wherein the ethylene-propylene copolymer has an Mw/Mn within a range from 6, or 8, or 10 to 14, or 16, or 20.

P19. The process of any one of numbered paragraphs 6 to 18, wherein the polypropylene has an Mw/Mn within a range from 4, or 6 to 8, or 10, or 12.

P20. The process of any one of numbered paragraphs 6 to 19, wherein the ethylene-propylene copolymer has an intrinsic viscosity (IV) within a range from 3, or 4 dL/g to 7, or 8, or 10 dL/g.

P21. The process of any one of numbered paragraphs 6 to 20, wherein the propylene-based impact copolymer has an ethylene-propylene to polypropylene weight average molecular weight ratio ($Mw_{(EP)}/Mw_{(PP)}$) of greater than 5, or 6, or 10, or within a range from 5, or 6, or 10 to 14, or 16, or 20.

P22. A propylene-based impact copolymer, optionally according to any one of the previous numbered paragraphs, comprising within the range from 5, or 8 wt % to 20, or 25, or 30 wt % of an ethylene-propylene copolymer, by weight of the propylene-based impact copolymer, imbedded in a continuous phase of polypropylene; wherein the ethylene-propylene copolymer comprises within the range from 25, or 30, or 35 wt % to 40, or 45, or 50, or 55 wt % ethylene-derived units by weight of the ethylene-propylene copolymer, and wherein the propylene-based impact copolymer has an MFR of at least 60, or 100 g/10 min, or within a range from 60, or 80, or 100 g/10 min to 130, or 140, or 160, or 180, or 200 g/10 min, and an $Mw_{(EP)}/Mw_{(PP)}$ of greater than 5, or 6, or 10, or within a range from 5, or 6, or 10 to 14, or 16, or 20.

P23. The propylene-based impact copolymer of numbered paragraph 22, wherein the polypropylene has an MFR of at least 100, or 120, or 160, or 200, or 220, or 260, or 300 g/10 min; or within a range from 100, or 120, or 160, or 200, or 220, or 260, or 300 g/10 min to 340, or 360, or 400, or 420, or 480, or 500 g/10 min.

P24. The propylene-based impact copolymer of numbered paragraphs 22 or 23, wherein the polypropylene has a pentad fraction greater than 0.95, or 0.96 by $^{13}C$ NMR; and wherein the polypropylene has a triad fraction greater than 0.97, or 0.975, or 0.98 by $^{13}C$ NMR.

P25. The propylene-based impact copolymer of any one of the previous numbered paragraphs 22 to 24, wherein the ethylene-propylene copolymer has an Mw/Mn within a range from 6, or 8, or 10 to 14, or 16, or 20; and wherein the polypropylene has an Mw/Mn within a range from 4, or 6 to 8, or 10, or 12.

P26. The propylene-based impact copolymer of any one of the previous numbered paragraphs 22 to 25, having an Mw/Mn within a range from 10, or 12, or 14 to 20, or 24, or 26, or 30.

P27. The propylene-based impact copolymer of any one of the previous numbered paragraphs 22 to 26, wherein the ethylene-propylene copolymer has an intrinsic viscosity (IV) within a range from 3, or 4, or 4.5 dL/g to 6.5, or 7, or 8, or 10 dL/g.

P28. The propylene-based impact copolymer of any one of the previous numbered paragraphs 22 to 27, wherein the ethylene-propylene copolymer has an Mz value of greater than 3000, or 3200, or 3400 kg/mole, or within a range from 3000, or 3200, or 3400 kg/mole to 3800, or 4000, or 4200, or 4400 kg/mole; and wherein the ICP has an Mz value of greater than 2800, or 3000, or 3200 kg/mole, or within a range from 2800, or 3000, or 3200 kg/mole to 3600, or 3800, or 4000, or 4200 kg/mole.

P29. The propylene-based impact copolymer of any one of the previous numbered paragraphs 22 to 28, having a flexural modulus of at least 1600, or 1660, or 1700 MPa, or within a range from 1600, or 1660, or 1700 MPa to 1800, or 1840, or 1880, or 1900, or 1940, or 2000 MPa.

P30. The propylene-based impact copolymer of any one of the previous numbered paragraphs 22 to 29, having a notched Izod impact strength of at least 3, or 3.2, or 3.6, or 4, or 4.2, or 4.6 kJ/m$^2$, or within a range from 3, or 3.2, or 3.6, or 4, or 4.2, or 4.6 kJ/m$^2$ to 5.2, or 5.4, or 5.6, or 5.8, or 6, or 6.2 kJ/m$^2$.

P31. A polymerization apparatus comprising (or consisting of) at least one liquid or slurry polymerization reactor; at least one second reactor fluidly connected and in series with the at least one liquid or slurry polymerization reactor; a first olefin/polyolefin separation means located within the fluid connection; and a second olefin/polyolefin separation means fluidly connected downstream of the at least one second reactor.

P32. The polymerization apparatus of numbered paragraph 31, wherein the at least one second reactor is at least one low pressure reactor.

P33. The polymerization apparatus of numbered paragraphs 31 and 32, wherein the at least one second reactor is a gas phase reactor.

P34. The polymerization apparatus of any one of numbered paragraphs 31 to 33, wherein the first olefin/polymerization separation means operates at a pressure above the second reactor.

P35. The polymerization apparatus of any one of numbered paragraphs 31 to 34, wherein the second olefin/polymerization separation means operates at a pressure at or below the second reactor.

P36. The polymerization apparatus of any one of numbered paragraphs 31 to 35, further comprising a polymerization medium comprising a catalyst, activator, and at least one amino-silane external donor.

P37. The polymerization apparatus of any one of the numbered paragraphs 31 to 36 used to operate in a process as in any one of numbered paragraphs 1 to 21, most preferably to produce a propylene-based impact copolymer as in any one of numbered paragraphs 22 to 30.

P38. Also is the use of an amino-silane as described herein in a polymerization process to form a propylene-based impact copolymer comprising within the range from 5 wt % to 30 wt % of an ethylene-propylene copolymer, by weight of the propylene-based impact copolymer, imbedded in a continuous phase of polypropylene as described in any one of the previous numbered paragraphs.

P39. Also is the use of only two olefin/polyolefin separation steps in a polymerization process to form a propylene-based impact copolymer comprising within the range from 5 wt % to 30 wt % of an ethylene-propylene copolymer, by weight of the propylene-based impact copolymer, imbedded in a continuous phase of polypropylene as described in any one of the previous numbered paragraphs.

With respect to a composition, "consisting essentially of" means that the claimed polyolefin, composition and/or article includes the named components and no additional components that will alter its measured properties by any more than ±1, 2, 5, or 10%, and most preferably means that "additives" are present, if at all, to a level of less than 5, or 4, or 3, or 2 wt % by weight of the composition. Such additional additives can include, for example, inorganic fillers (such as talc, glass, and other minerals), carbon black, nucleators, clarifiers, colorants (soluble and insoluble), foaming agents, antioxidants, alkyl-radical scavengers (preferably vitamin E or other tocopherols and/or tocotrienols), anti-ultraviolet light agents, acid scavengers, curatives and cross-linking agents, mineral and synthetic oils, aliphatic and/or cyclic containing oligomers or polymers (and other "hydrocarbon resins"), and other additives well known in the art.

With respect to a process or apparatus, the phrase "consisting essentially of" means that the claimed process does not include any other process steps (or apparatus features/means) that change the nature of the overall claimed process, such as an additional polymerization step, or additional olefin/polyolefin separation step, or additional re-directing of polymerization medium flow, heating, cooling, pressurizing, and/or depressurizing that impart a change in the final polyolefin product by any more than ±1, 2, or 5% from a measured chemical properties.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A process to produce polyolefins comprising combining olefins with a polymerization catalyst and hydrogen in the presence of at least one amino-silane donor to form a polymerization medium comprising a polypropylene having an MFR of at least 260 g/10 min, the process comprising at least a first stage and at least a second stage, wherein the polymerization medium is transferred from at least the first stage to at least the second stage; wherein hydrogen is removed from the polymerization medium prior to transferring the polymerization medium from the first stage to the second stage; and wherein at least one first stage is a solution or slurry polymerization process and at least one second stage is a gas phase polymerization process, and wherein there is only one olefin/polyolefin separation step between the first and second stages.

2. The process of claim 1, wherein the amino-silane is selected from structures comprising $R^1{}_n Si(NR^2{}_2)_{4-n}$, wherein each $R^1$ is independently selected from hydrogen, C1 to C10 linear and branched alkyls and alkenes, C4 to C12 cycloalkyls and cycloalkenes, C5 to C14 aryls, C6 to C20 alkylaryls, C1 to C10 linear and branched alkoxys, C4 to C12 cycloalkoxys, C5 to C14 aryloxys, and C6 to C20 alkylaryloxys; and each $R^2$ is independently selected from hydrogen, C1 to C10 linear and branched alkyls and alkenes, C4 to C12 cycloalkyls and cycloalkenes, C5 to C14 aryls, and C6 to C20 alkylaryls; and wherein "n" is 0, 1, 2, or 3.

3. The process of claim 1, wherein the combining occurs at a pressure of less than 1000 psig (6.9 MPa).

4. The process of claim 1, wherein the combining occurs at a hydrogen concentration of less than 10,000 mppm (based on olefin feed).

5. The process of claim 1, wherein the olefins comprise at least 80 wt % propylene and less than 20 wt % ethylene.

6. The process of claim 1, wherein the combining occurs at a temperature within a range from 50° C. to 120° C.

7. The process of claim 1, wherein the hydrogen is removed using a physical pressure drop and re-pressurization method or chemical reaction of hydrogen with a chemical scavenging agent, or both.

8. The process of claim 1, wherein the combining occurs below the bubble point.

9. The process of claim 1, wherein the olefins comprise propylene, thus producing polypropylene.

10. The process of claim 1, obtaining a propylene-based impact copolymer having an MFR within a range from 60 g/10 min to 200 g/10 min.

11. The process of claim 10, wherein the propylene-based impact copolymer has an ethylene-propylene copolymer to polypropylene weight average molecular weight ratio ($Mw_{(Ep)}/Mw_{(pp)}$) of greater than 5.

12. A process of polymerizing olefins comprising:
combining propylene with a polymerization catalyst, hydrogen, and at least one amino-silane donor to form polypropylene in a polymerization medium under solution or slurry conditions at or below the bubble point, wherein the polymerization medium comprises a polypropylene having an MFR of at least 260 g/10 min;
removing hydrogen from the polymerization medium;
transferring the polymerization medium to a gas phase reactor and further combining with ethylene; and
obtaining a propylene-based impact copolymer comprising an ethylene-propylene copolymer in a continuous phase of polypropylene, the propylene-based impact copolymer having a melt flow rate of at least 60 g/10 min.

13. The process of claim 12, wherein the amino-silane is selected from structures comprising $R^1{}_n Si(NR^2{}_2)_{4-n}$, wherein each $R^1$ is independently selected from hydrogen, C1 to C10 linear and branched alkyls and alkenes, C4 to C12 cycloalkyls and cycloalkenes, C5 to C14 aryls, C6 to C20 alkylaryls, C1 to C10 linear and branched alkoxys, C4 to C12 cycloalkoxys, C5 to C14 aryloxys, and C6 to C20 alkylaryloxys; and each $R^2$ is independently selected from hydrogen, C1 to C10 linear and branched alkyls and alkenes, C4 to C12 cycloalkyls and cycloalkenes, C5 to C14 aryls, and C6 to C20 alkylaryls; and wherein "n" is 0, 1, 2, or 3.

14. The process of claim 12, wherein the first combining step occurs at a pressure of less than 1000 psig (6.9 MPa).

15. The process of claim 12, wherein the first combining step occurs at a hydrogen concentration of less than 10,000 mppm (based on propylene feed).

16. The process of claim 12, wherein the first combining occurs at a temperature within a range from 50° C. to 120° C.

17. The process of claim 12, wherein the polypropylene has a MFR of at least 100 g/10 min.

18. The process of claim 12, wherein the propylene-based impact copolymer has an ethylene-propylene copolymer to polypropylene weight average molecular weight ratio ($Mw_{(Ep)}/Mw_{(pp)}$) of greater than 5.

19. A propylene-based impact copolymer comprising within the range from 5 wt % to 30 wt % of an ethylene-propylene copolymer, by weight of the propylene-based impact copolymer, imbedded in a continuous phase of polypropylene, the polypropylene having an MFR of at least 260 g/10 min;

wherein the ethylene-propylene copolymer comprises within the range from 25 wt % to 55 wt % ethylene-derived units by weight of the ethylene-propylene copolymer, and     wherein the propylene-based impact copolymer has an MFR of at least 60 g/10 min, and an $Mw_{(Ep)}/Mw_{(pp)}$ of greater than 5.

20. The propylene-based impact copolymer of claim 19, wherein the polypropylene has an MFR of at least 100 g/10 min.

21. The propylene-based impact copolymer of claim 19, wherein the polypropylene has a pentad fraction greater than 0.95 by $^{13}$C NMR, and a triad fraction greater than 0.97 by $^{13}$C NMR.

22. The propylene-based impact copolymer of claim 19, wherein the ethylene-propylene copolymer has an Mw/Mn within a range from 6 to 20.

23. The propylene-based impact copolymer of claim 19, wherein the ethylene-propylene copolymer has an intrinsic viscosity (IV) within a range from 3 dL/g to 10 dL/g.

24. An automotive component comprising the propylene-based impact copolymer of claim 19.

\* \* \* \* \*